(12) United States Patent
Li et al.

(10) Patent No.: US 9,398,081 B2
(45) Date of Patent: Jul. 19, 2016

(54) AUTOMATING CLIENT DEVELOPMENT FOR NETWORK APIS (71) Applicant: Futurewei Technologies, Inc., Plano, TX (US)

(72) Inventors: Li Li, Bridgewater, NJ (US); Wu Chou, Basking Ridge, NJ (US); Wei Zhou, Sandy Bay (AU)

(73) Assignee: Futurewei Technologies, Inc., Plano, TX (US)

( * ) Notice: Subject to any disclaimer, the term of this patent is extended or adjusted under 35 U.S.C. 154(b) by 154 days.

(21) Appl. No.: 14/464,040

(22) Filed: Aug. 20, 2014

(65) Prior Publication Data
US 2016/0057207 A1 Feb. 25, 2016

(51) Int. Cl.
*G06F 9/54* (2006.01)
*H04L 29/08* (2006.01)
*H04L 29/06* (2006.01)
*H04N 21/443* (2011.01)
*H04M 7/00* (2006.01)

(52) U.S. Cl.
CPC *H04L 67/10* (2013.01); *G06F 9/54* (2013.01); *G06F 9/547* (2013.01); *H04L 67/42* (2013.01); *H04M 7/0021* (2013.01); *H04N 21/4431* (2013.01)

(58) Field of Classification Search
CPC ....... G06F 9/54; G06F 9/547; G06F 9/44526; G06F 8/36; G06F 8/31; G06F 3/1292; G06F 21/604; G06F 17/2288; G06F 11/3452; G06F 11/3684; H04N 21/4431; H04M 7/0021
See application file for complete search history.

(56) References Cited

U.S. PATENT DOCUMENTS

| 8,510,762 | B1 * | 8/2013 | Gregorio | G06F 8/36 717/104 |
| 2008/0134286 | A1 * | 6/2008 | Amdur | G06F 21/604 726/1 |
| 2009/0013244 | A1 * | 1/2009 | Cudich | G06F 17/2288 715/234 |
| 2010/0083287 | A1 * | 4/2010 | Maximilien | G06F 8/31 719/328 |
| 2011/0197197 | A1 * | 8/2011 | Ni | G06F 9/547 718/104 |
| 2011/0283148 | A1 * | 11/2011 | Rossi | G06F 11/3684 714/38.1 |
| 2012/0102100 | A1 * | 4/2012 | Soukup | G06F 9/547 709/203 |
| 2012/0167094 | A1 * | 6/2012 | Suit | G06F 11/3452 718/100 |
| 2013/0125145 | A1 * | 5/2013 | Balmori Labra | G06F 9/44526 719/328 |
| 2014/0313542 | A1 * | 10/2014 | Benchorin | G06F 3/1292 358/1.15 |

* cited by examiner

*Primary Examiner* — Le H Luu
(74) *Attorney, Agent, or Firm* — Futurewei Technologies, Inc.

(57) ABSTRACT

System and method of automating client development for an application programming interface (API). An embodiment includes an apparatus capable of receiving information regarding a target application resource accessible by an API, and of generating a selected sequence of API calls based on weighted transitions in an API model representing resources needed for a client to perform interactions with the API. The apparatus is able to automatically generate a client program for interacting with the API according to a sequence of API calls. Additionally, methods are described for converting a model of an API into a directed, weighted graph, allowing determination of a selected sequence of API calls to access a target application resource. The API may be a Representational State Transfer API (REST API) implemented for a software defined network (SDN).

20 Claims, 9 Drawing Sheets

AUTOMATING CLIENT DEVELOPMENT FOR NETWORK APIS

FIELD OF THE INVENTION

The present disclosure relates generally to the field of communication networks, and more specifically, to the field of client development for network application programming interfaces (APIs).

BACKGROUND OF THE INVENTION

An application programming interface (API) permits programmatic access to an application, and may be broadly described as a specification for how disparate entities (frequently software applications) are able to interact with each other. The interactions enabled by the API may include retrieval and update of application resources, which are accomplished via program code. An interface may be provided for the API such that a user is able to interact with the API manually in order to access application resources, or a client application may interact programmatically with the API. APIs are frequently used in the context of web service development.

When the Representational State Transfer (REST) architectural style is used to design API services on a network, such an API may be referred to as a REST API. A REST API describes a particular way for connecting distributed services on a network, and is constructed to follow a set of principles for web design. These design principles enable design of a robust, reliable, and scalable web application. The Hypertext Transfer Protocol/1.1 (HTTP/1.1) is typically used in an implementation of a REST API. There are many examples of web services that use REST design principles, and this architectural style is gaining popularity in cloud and software defined networking (SDN) applications in particular.

Conventionally, developing a client to interact with an API (e.g., a REST API) involves many programming steps. A software developer typically begins with a set of published documents on the particular service (e.g., a web service); the software developer must manually read the documentation, understand the architecture and interactions provided by the REST API for the service, and then write programs to interact with the service. The resulting end-product is specialized client code that interacts with one specific REST API in order to achieve a specific goal. This can be an arduous process, and the client code often cannot be used to achieve a different goal, and it may be difficult to upgrade following any changes to the REST API.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment includes a system and method of automating client development for an application programming interface (API). An embodiment includes an apparatus capable of receiving information regarding a target application resource accessible by an API, and of generating a selected sequence of API calls based on weighted transitions in an API model representing resources needed for a client to perform interactions with the API. The apparatus is able to automatically generate a client program for interacting with the API according to a sequence of API calls. Additionally, methods are described for converting a model of an API into a directed, weighted graph, allowing determination of a selected sequence of API calls to access a target application resource. The API may be a Representational State Transfer API (REST API) implemented for a software defined network (SDN).

More specifically, an aspect of the present disclosure provides an apparatus that includes a transceiver configured to receive a request including a target application resource accessible to an application programming interface (API) executable on the apparatus. The apparatus further includes a processor coupled to the transceiver and configured to access a description of the API and to generate an API model based on the description. The description includes application resource representations corresponding to application resources accessible to the API, and application transitions describing directed connections amongst the application resource representations and corresponding to API calls defined by the API, wherein the API model includes elements corresponding to the application resource representations and weights corresponding to the application transitions and associated with the API calls. The processor is configured to determine, based on the weights, a selected sequence of elements between a first and a second element of the elements. The first element corresponds to an initial application resource accessible to the API and the second element corresponds to the target application resource. The processor is configured to generate selected API calls based on a selection of the application resource representations and the application transitions corresponding to the selected sequence, and to send the selected API calls to a client device.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Automating Network API Client Development

Embodiments of the present disclosure pertain to systems and methods of automating client application development for an API. In one aspect of the present disclosure, client development for an API is automated by determining a sequence of API calls (for example, a sequence of hypertext links) to be executed in order to access a target application resource made available to the client application by the API, where the determination of the sequence of API calls is made according to a model of the API including weights associated with the interactions a client application may have with the API in order to access a resource. Herein, an "application resource" may refer to a software component such as a document, image, service, system, device, directory, data store, or a combination thereof. The resultant API call sequence details the particular order of specific application resource calls and interactions that a user agent of the API is able to make in order to access the target application resource in a selected manner. Herein, a "physical resource" may refer to a computing, storage, and/or network resource, such as the size of messages sent and/or received between a client application and the system on which the API is implemented, computer memory required to perform an interaction, a computer processor usage, a disk storage usage, a network bandwidth, or a combination thereof.

Figure 1:
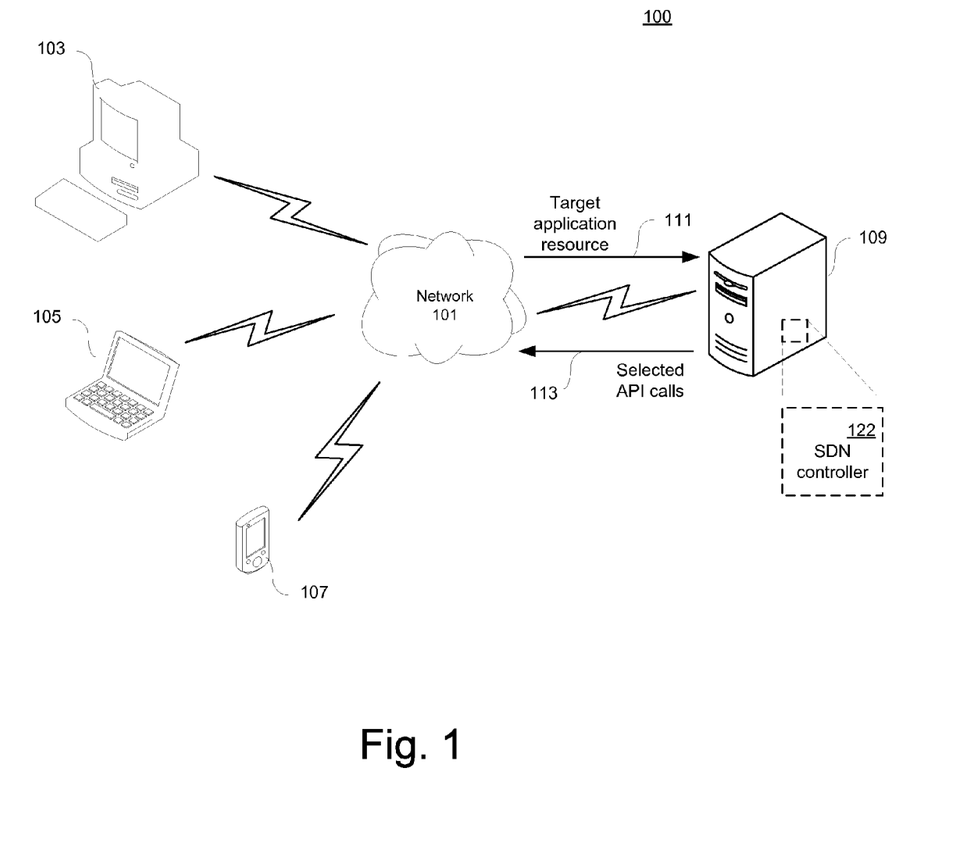
FIG. 1 illustrates an exemplary network within which embodiments of the present disclosure may be implemented.

FIG. 1 is a block diagram of an exemplary network architecture 100, in which client systems 103, 105 and 107, and server 109, may be coupled to a network 101 according to an embodiment of the present disclosure. The client systems 103, 105 and 107 and server 109 generally represent any type or form of computing device or system, including a general purpose computing system environment. In its most basic configuration, a general purpose computing system typically includes at least one processing unit and memory, and an address/data bus (or other interface) for communicating information. Depending on the exact configuration and type of computing system environment, memory may be volatile (such as RAM), non-volatile (such as ROM, flash memory, etc.) or some combination of the two. The client systems 103-107 and the server 109 may each comprise one or more signal communication interfaces (input/output devices, e.g., a network interface card, a transmitter and receiver, also called a "transceiver").

The server 109 is capable of receiving information regarding a target application resource to be accessed by an API, and automatically generating a sequence of API calls (e.g., client application requests), and may be configured to provide various services and/or run certain software applications such as that described below. The network 101 generally represents any telecommunication or computer network including, for example, an intranet, a wide area network (WAN), a local area network (LAN), a personal area network (PAN), or the Internet. In some embodiments, the network 101 may comprise a software defined network (SDN), wherein the intelligence system (the control plane) that controls the data traffic is implemented as an software application program and decoupled from the underlying system forwarding the traffic to the selected destination (the data plane). The network devices may include routers, switches, or any devices that act as routers or switches, e.g., servers, desktops, mobile computing devices, etc.

A communication interface may be used to provide connectivity between each client system 103, 105 and 107 and the network 101. The client systems 103, 105 and 107 are able to access information on the server 109 using, for example, a Web browser or other client software. Such software is able to allow the client systems 103, 105 and 107 to access data hosted by the server 109. Although FIG. 1 depicts the use of a network (such as the Internet) for exchanging data, the embodiments described herein are not limited to the Internet or any particular network-based environment.

In an embodiment server 109 acts as an SDN controller in the control layer of a virtual network, such that an application layer device, e.g. device 103, 105, or 107, can access an SDN resource through hyperlink representations that are made available via a northbound REST API comprised by the server 109, according to embodiments of the present disclosure. In an embodiment, the processor of server 109 comprises an SDN controller component 122 configured to perform functions described herein, such as exemplary processes 300 and 500 of FIGS. 3 and 5, respectively. Alternatively, the processor is able to be operable to execute an SDN controller program stored in a storage media of the server 109 and configured to perform functions described herein. In the illustrated example, the logically centralized SDN controller server 109 is employed to control the behaviors of underlying data forwarding elements (e.g., switches and routers) comprised by the virtual network, through some southbound APIs via, for example, the OpenFlow protocol. On the other hand, the SDN controller server 109 also provides an abstraction of the network functions with the northbound API for client application programs, e.g., a client application implemented in device 103, to consume the network services and to configure the network dynamically. Any device in communication with server 109 is able to utilize the northbound API comprised by server 109 in order to consume network services and to configure the network dynamically.

A request for a target application resource 111 (e.g., 619 in FIG. 6) can be indicated by device 103 (or any connected device) and sent to the SDN controller server 109 for accessing a representation of a resource, e.g. for operations on underlying network components. The SDN controller server 109 is able to generate a selected sequence of API calls 113 in order to access the indicated representation of the application resource (e.g., via process 500 in FIG. 5). The SDN controller server 109 is able to provide this sequence to the device 103, in order for the device 103 to utilize the sequence of API calls in a client application interfacing with the API comprised by the SDN controller server 109. In such a manner the SDN controller server 109 is able to enable automatic development of a client application on the device 103, in that the device 103 is able to provide the specified sequence of API calls to an integrated development environment comprised by the device 103 in order to generate a client application for the SDN controller server 109 API.

Figure 2A:
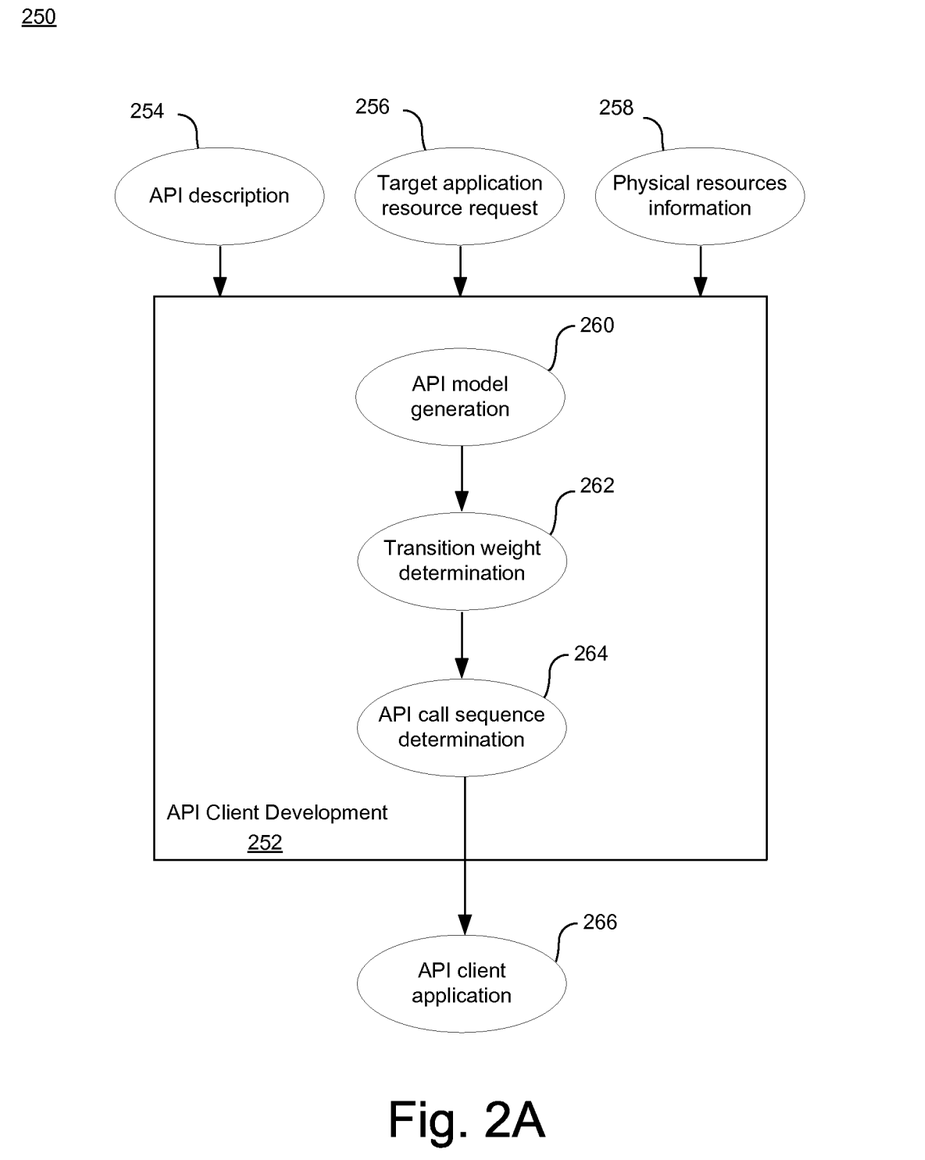
FIG. 2A depicts an exemplary information flow diagram for developing an API client tool for accessing a target application resource in an API in accordance with an embodiment of the present disclosure.

FIG. 2A is a block diagram depicting an exemplary information flow 250 for developing an API client application 266 for programmatic interaction with an API, according to an embodiment of the present disclosure. The information flow 250 includes an API description 254, a target application resource request 256, and physical resources information 258, all of which are provided to perform API client development 252. API client development 252 may be performed by a program, logic, and/or functionality that is implemented in software and/or hardware. The API client development 252 comprises API model generation 260, a transition weight determination 262, and an API call sequence determination 264, and the API client development 252 is operable to generate the API client application 266.

The API description 254 specifies the client requests available to client entities using the API, as well as the protocols for executing the client requests (e.g., protocols for performing an interaction between a client entity and the API). The API description 254 details the relationship of possible interactions between a client application and the API (e.g., which other resources are accessible to a client application from a particular resource), including how the resources of the underlying application made available via the API. In some embodiments the API description 254 is embodied in a machine-readable format (e.g. XML, JSON, and other formats known to one skilled in the art). In some embodiments the API description 254 is provided as, for example, a published document made available by the developer of the API. In an embodiment the process 250 is able to generate the API description 254.

The API client development 252 is able to generate the API client application 266, which in an embodiment is a program enabling programmatic interactions with an API described by API description 254. In one embodiment a "client" is used to refer to any application adapted to make requests of the API. An indication is provided of a target application resource request 256 (e.g., from an API client developer, or from a user agent). The target application resource request 256 is able to be, for example, a request for a document, a file, and a HTTP message entity, instance, or variant.

The target application resource request 256 and the API description 254, along with physical resources information 258, are used by API client development 252 for API call sequence determination 264. The API model generation 260 uses the API description 254 to build a model of the API that includes elements representing the application resources accessible to the API, along with transitions that represent the possible client interactions with the API and which specify the connection relationship amongst the elements. The transition weight determination 262 utilizes the physical resources information 258 in order to determine an associated weight for each transition in the API model. For example, the physical resources information may be regarding a transmission delay between client and server in a client-server network (a latency), the size of messages sent and/or received between a client application and the system on which the API is implemented, computer memory required to perform an interaction, a computer processor usage, a disk storage usage, a network bandwidth—measurement of any physical resource associated with the interactions permitted by the API model is consistent with the spirit and scope of the present disclosure.

The API call sequence determination 264 utilizes the resultant transition weights from the transition weight determination 262 in order to determine a sequence of API calls for the client application to optimally access the target application resource. This sequence of API calls can be utilized to generate the API client program 266. The API client program 266 is used for performing client interactions with the API, in order to access the target application resource in a selected manner.

The API model generation 260 is able to generate models of several forms, including a Petri Net, a weighted graph, a matrix, a table, and other forms suitable for describing an API model. In some embodiments the API model generated by API model generation 260 is embodied in a machine-readable format published by a server (e.g. XML, JSON, and other formats known to one skilled in the art).

In some embodiments the API is implemented for a web service, and the target application resource request 256 represents a request for a resource representation (e.g. XML, JSON, and other formats known to one skilled in the art). In some embodiments the API is implemented in a software defined network (SDN) as a northbound API, and interfaces between an SDN controller and an application layer of the SDN. In an embodiment the target application resource request 256 is the retrieval of data from a database, where the database may be accessible via a local network (LAN), wide-area network (WAN), a mobile network, e.g. a cellular network, or over the internet via HTTP methods POST, GET, PUT, and DELETE.

Figure 6:
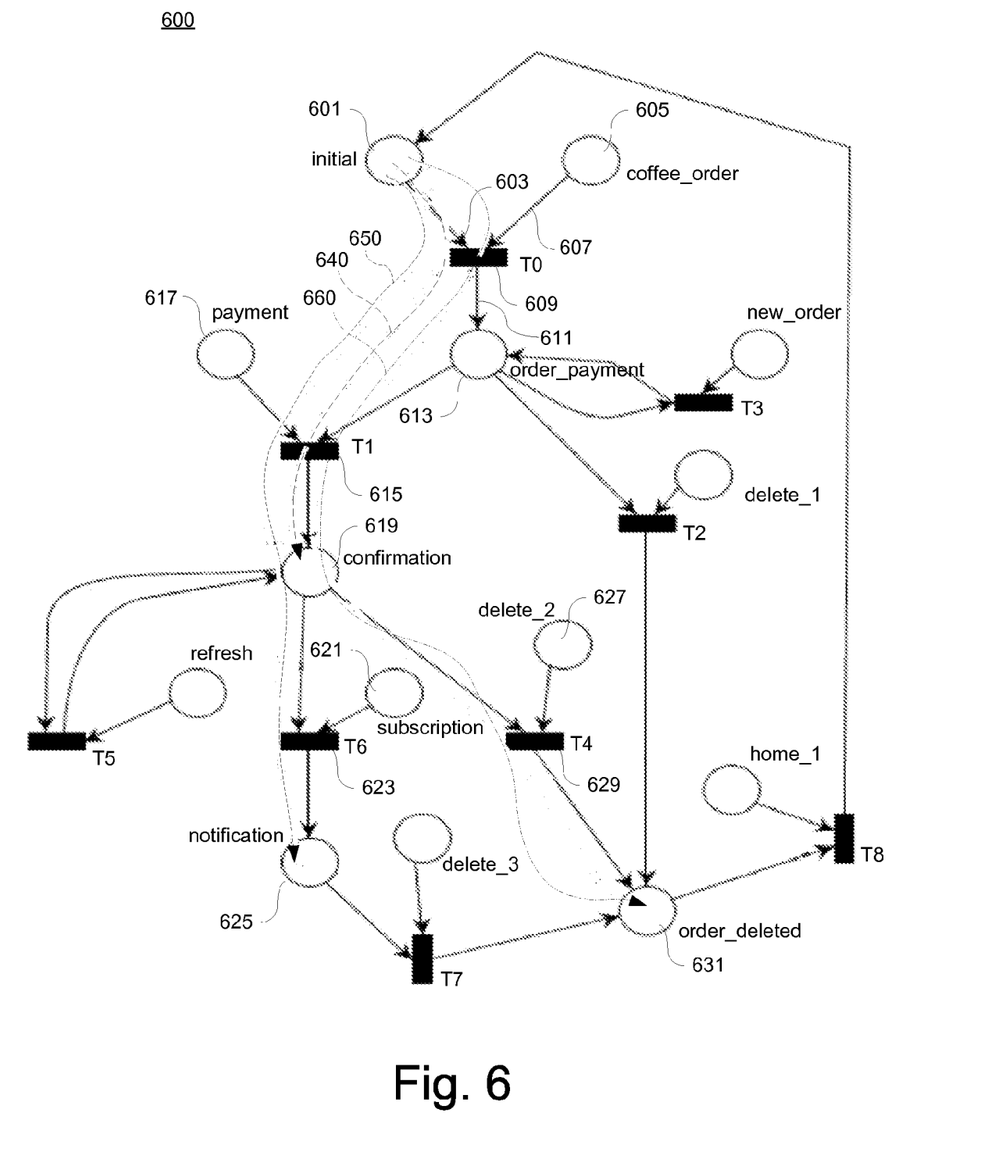
FIG. 6 is a diagram of a network API model illustrating an exemplary set of target application resources with corresponding API call sequences, in accordance with an embodiment of the present disclosure.

In some embodiments, multiple target application resources requests 256 are provided, and the API call sequence determination 264 determines an interaction sequence to access each of the multiple target application resources. Other target application resource specifications are possible and are consistent with the spirit and scope of the present disclosure. The API call sequence determination 264 is described in greater detail in the description of FIGS. 3 and 4A-4C. Exemplary API call sequences are illustrated in FIG. 6, and are described in greater detail below.

Client Development for a Rest API

A method according to an embodiment of the present disclosure can be used to develop a client application for a REST API. A REST API uses a resource identifier to identify a particular resource involved in an interaction between the REST API and a client application interfacing with the REST API. The resource identifier may be a Uniform Resource Locator (URL) link or Uniform Resource Identifier (URI). A client application utilizing a REST API performs actions on a resource (e.g., the target application resource) by exchanging representations with that resource and transferring its own state according to the received representation provided by the REST API. A representation typically has a sequence of bytes, and representation metadata that describes those bytes. The entity responsible for generating a resource representation may be used to characterize the resource representation—i.e., a client representation may refer to a representation that is generated by a client application, and a server representation may refer to a representation that is generated by a server. Examples of a representation include: a document, a file, and a HTTP message entity, instance, or variant.

A REST API can be described by using a REST Chart. Such a REST Chart includes a set of hypermedia representations and the transitions among them, which is typical of a REST API that is driven by hypermedia. The REST Chart may utilize a colored Petri Net network model that has a topology whose token markings define the representational state space of user agents of the REST API, i.e., the token markings are able to characterize every possible state of the REST API following permitted client application interactions. Each transition in the REST Chart specifies the possible interactions with the resource referenced by a hyperlink in a type representation. In particular, a type representation becomes a Petri Net place that can have Petri Net tokens denoting resource representations of that type (i.e., color). A transition has at least two input resource representations and may have several output resource representations (response and faults); one of the input resource representations to the transition contains the hyperlink to the target resource. The REST hypermedia constraint is enforced by Petri Net transition rules: 1) a transition can be fired if and only if all its input resource representations have the right kind of tokens; 2) After a transition fires, its output resource representation will have the right kind of tokens.

When firing a transition to access an application resource, a client application uses a client connector to interact with an API having an interface comprising input and output parameters. In each interaction, the input and output parameters contain: 1) control data (e.g. HTTP verbs and status); 2) optional metadata about the resource representation (e.g. HTTP headers); and 3) an optional resource representation. In addition, a client application also needs to know the transfer protocol, e.g. HTTP, in order to call the right client connector. These data thus constitute the interaction instructions for firing the transitions in order to access application resources made available by the API.

Figure 2B:
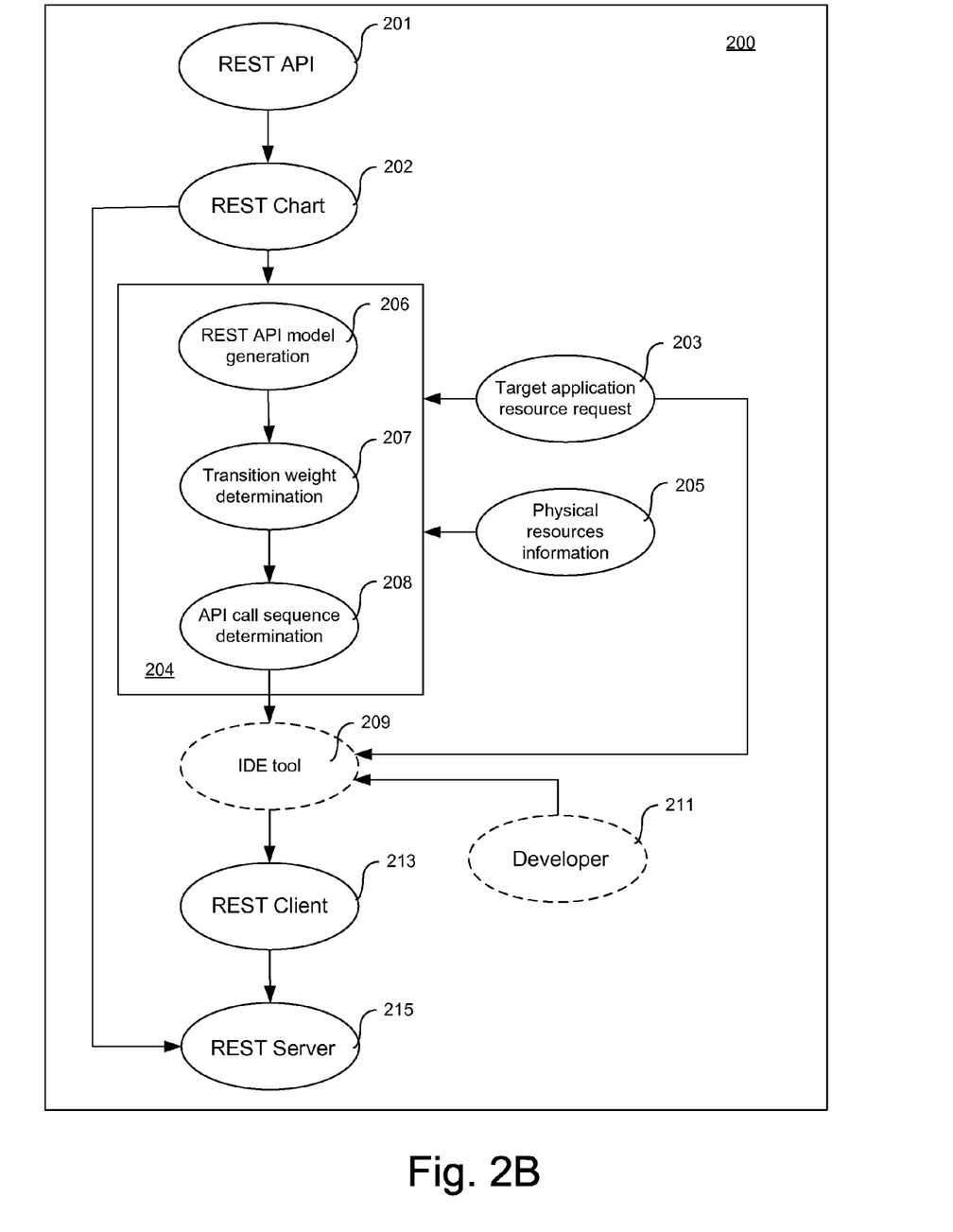
FIG. 2B depicts an exemplary information flow diagram for developing a REST client to access a target application resource via a REST API in accordance with an embodiment of the present disclosure.

FIG. 2B is a block diagram illustrating an exemplary architecture 200 wherein a REST client 213 is generated for automatically performing client actions with a REST API, in accordance with an embodiment of the present disclosure. A REST API 201 of FIG. 2B is designed according to a RESTful architecture, following REST design principles. For example, the REST API 201 is able to be implemented on a client-server network (REST server 215), wherein interactions of a client application with the REST API 201 are performed via client requests (including hypertext link traversal) to specify and to receive application resources made available via the REST API 201. In an embodiment the REST API 201 is implemented on an SDN controller, the REST API 201 providing an abstraction of the SDN network functions via a programmable interface, such that client applications in the application layer are enabled to consume the network services and/or to configure the network dynamically (e.g., the REST API 201 is configured as a northbound API of an SDN).

A REST Chart 202 describes the REST API 201. As described above, the token markings of the REST Chart 202 define the representational state space of client applications interacting with the REST API 201. In some embodiments the REST Chart 202 is able to be generated from published documentation describing REST API 201. In some embodiments the REST Chart 202 is embodied in a machine-readable format published by a server (e.g. XML, JSON, or other formats known to one skilled in the art).

A target application resource request 203 indicates an application resource to be accessed by the REST API 201, which is received along with the REST Chart 202 by REST client development 204. The REST client development 204 comprises REST API model generation 206, a transition weight determination 207, and an API call sequence determination 208, each of which are may be a program, logic, and/or functionality that is implemented in software and/or hardware. The REST API model generation 206 builds a model of the REST API 201 that includes elements representing the application resources accessible to the REST API 201, along with transitions that represent the possible client interactions with the REST API 201 and which specify the connection relationship amongst the elements. The transition weight determination 207 utilizes physical resources information 205, provided to REST client development 204, in order to determine an associated weight for each transition in the REST API model. For example, the physical resources information may be regarding a transmission delay between client and server in a client-server network (a latency), the size of messages sent and/or received between a client application and the system on which the API is implemented, computer memory required to perform an interaction, a computer processor usage, a disk storage usage, a network bandwidth— measurement of any physical resource associated with the interactions permitted by the API model is consistent with the spirit and scope of the present disclosure.

The API call sequence determination 208 functions to determine an optimal sequence of API calls for a client application to make to the REST API 201 in order to access the application resource specified by the target application resource request 203. The API call sequence determination 208 utilizes the resultant transition weights from the transition weight determination 207 in order to determine a sequence of API calls for the client application to optimally access the target application resource. This sequence of API calls can be utilized to generate the REST client 213. The REST client 213 is used for performing client interactions with the REST API, in order to access the target application resource in a selected manner.

In some embodiments the API call sequence 208 is provided to an Integrated Development Environment (IDE) tool 209, where the IDE tool 209 is utilized by a developer 211. In some embodiments the IDE tool 209 is able to generate the REST client application 213. Embodiments of the present disclosure contemplate that the REST client 213 is able to be developed in a variety of languages (e.g., Java, C++, Python, JavaScript, etc).

The REST client application 213 is generated to automatically perform interactions in the REST API 201, implemented on the REST server 215. In some embodiments the REST client 213 acts as a client in a client-server network, and automatically performs client actions to interact with the REST server 215 in order to access the target application resource 203 of the REST API 201. For example, the REST client 213 is able to select and traverse hyperlinks provided by the REST API 201, in order to proceed from an initial state and to access the resource specified by target application resource request 203 according to the API call sequence 208. The REST API 201 is able to be implemented on any of several network types, including a client-server network, a peer-to-peer network, an SDN, a cloud-based network, and other network types well-known to one skilled in the art.

In the context of SDN controller northbound APIs, REST APIs may include software components that provide network services, such as connecting a plurality of virtual machines by an isolated virtual IP network. In some embodiments, the network services can be performed by managing three types of entities: a virtual network to which virtual machines attach by ports, an IP address block (subnet), and a port that receives IP addresses when it joins the subnets. A resource representation may include an initial URI of a REST API as an entry URI for a client to access the REST API. The URI contained in the initial representation identifies the resources for accessing each of the three entities of the network service program. After accessing the entry URI, a client application can then obtain the hyperlinks to access the three types of entities. The operations on these types of entities may include list, search, read, create, update and delete. In addition, a network entity has two additional hyperlinks for accessing its belonging subnet and port entities.

The particular IDE for the IDE tool 209 can be selected from those IDEs known to one skilled in the art (e.g., Eclipse, ActiveState Komodo, NetBeans, etc.) to be suitable for the particular application. The IDE tool 209 can be used by the developer 211 to write and test code and thereby generate the REST client application 213 capable of both decision-making and performing interactions with the REST API 201. For example, the REST client 213 may perform a test by sending messages to a server in a client-server network, to ascertain if the REST client 213 is functioning properly to access the target application resource, where the target application resource is a webpage retrieval.

Determining an Optimal Sequence of API Interactions—the API Call Sequence

As described above in FIG. 2A, one of the steps for accessing the target application resource is providing a target application resource request 256 and the API description 254 to the API client development 252. The API client development 252 comprises an API model generator 260, which in an embodiment includes a process of generating a directed, weighted graph that is based on the API description 254. FIGS. 3 and 4A-4C describe generation of an exemplary directed, weighted graph based on an API description, which according to embodiments of the present disclosure is a model generated by API model generation 260. In general, resources associated with a system or systems in a distributed network are represented as "resource representations" in an API model, and interactions are represented as "transitions." As an example, an API model for a webpage application may have "resource representations" representing a login page, an orders page, a payment page, and a confirmation page, and a client selecting hypertext links on the webpage to navigate from one page to another may be modeled as "transitions" in the API model.

While the API description describes the relationship between application resources accessible to the API (e.g., clicking link "login" on a home page will lead to a login page), it does not provide on its face an optimal path for a client to navigate from an initial resource representation to a target resource representation. To determine an optimal path, information is needed about the relative cost of performing the interactions a client application may make with the API. The directed, weighted graph provides this information by retaining the interaction relationships specified for the API (i.e., which resources are connected and what actions are necessary to access the resources), and further incorporating a "weight" that represents a measure of a physical resource (e.g. network bandwidth) associated with the execution of an interaction. By associating a weight with each possible interaction between a client application and the API, a comparison may be made of the physical resources required by the different paths that transition from the initial resource representation to the target resource representation, wherein a target resource accessible to the API may be accessed and/or modified.

Figure 3:
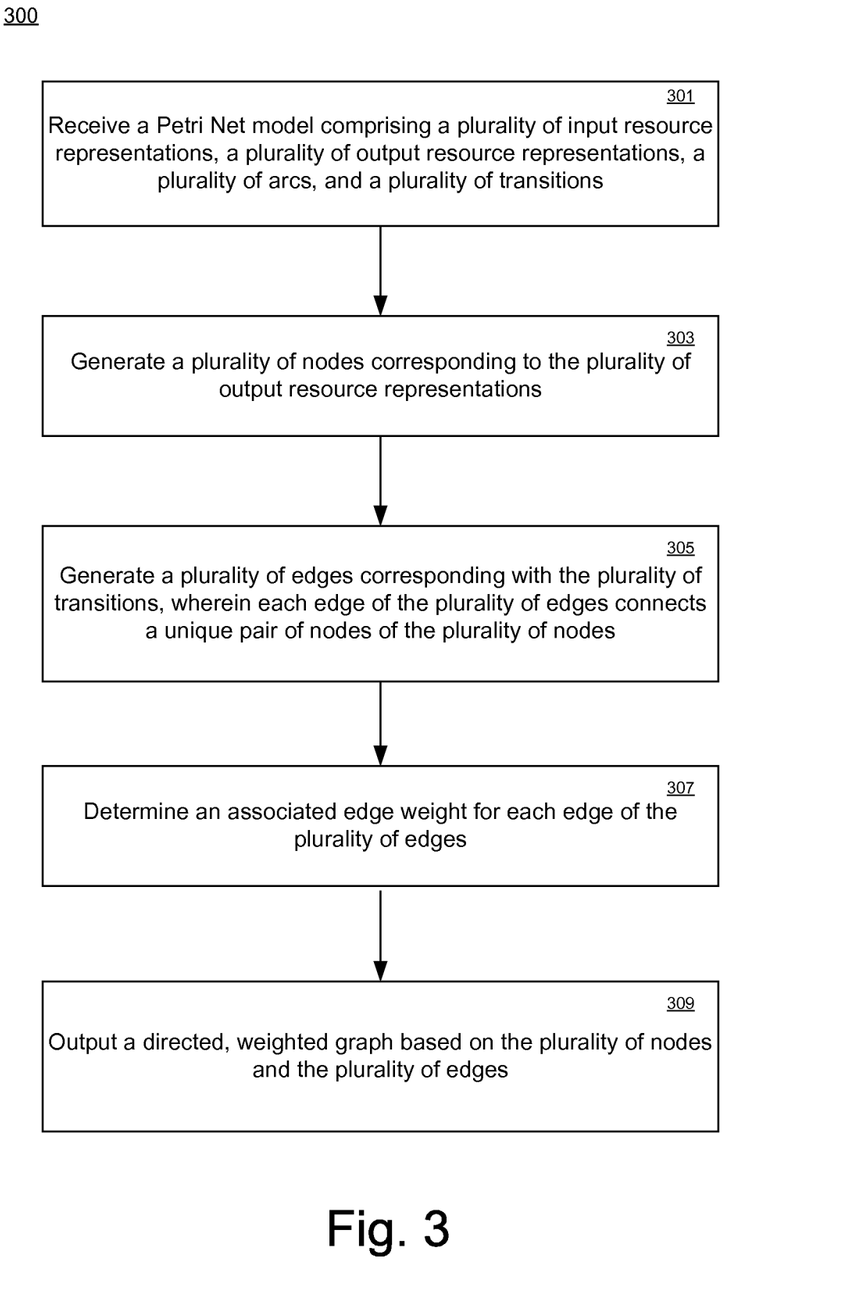
FIG. 3 is a flow chart illustrating an exemplary process for converting a Petri Net model to a directed, weighted graph, in accordance with an embodiment of the present disclosure.

FIG. 3 is a flowchart depicting an exemplary process 300 for converting a Petri Net model into a directed, weighted graph, according to an embodiment of the present disclosure. According to embodiments of the present disclosure a Petri Net model can be used to describe a REST API (e.g., as API description 254 or REST Chart 202), and a directed, weighted graph can be generated by API model generation (e.g., API model generation 260 or REST API model generation 206). At step 301 the Petri Net model is accessed, where the Petri Net model comprises a plurality of input resource representation types, a plurality of output resource representation types, a plurality of transitions, and a plurality of arcs, each arc of the plurality of arcs connecting one resource representation type and one transition, respectively. In one embodiment the Petri Net models an API in a client-server network, where the plurality of input resource representation types represents client interactions (e.g., client resource representations), and the plurality of output resource representation types represents server information (e.g., server resource representations), including responses to client requests.

At step 303 a plurality of nodes is generated for the directed, weighted graph, where the plurality of nodes corresponds to the plurality of output resource representation types from step 301. In an embodiment, the plurality of nodes represents resource representation types where a server in a client-server network is responsible for providing information. At step 305 a plurality of edges is generated, corresponding to the interactions modeled in the Petri Net by transitions, where each edge of the plurality of edges connects a pair of nodes from the plurality of nodes generated at step 303.

At step 307 an associated weight for each edge in the plurality of edges is determined. In an embodiment, associated weights are determined according to the measurement of a physical resource associated with interactions of a client and server in a client-server network. For example, the weight may be a transmission delay between client and server in a client-server network (a latency), the size of messages sent and/or received, computer memory required to perform an interaction, a computer processor usage, a disk storage usage, a network bandwidth—measurement of any physical resource associated with the interactions permitted by the API is consistent with the spirit and scope of the present disclosure. In an embodiment, the associated weights is represented by an adjacency matrix for the nodes in the directed, weighted graph, such that the "cost" of transitioning from one node to any of its adjacent nodes is defined according to the measurement of the physical resource or resources used to determine the associated weight.

The directed, weighted graph is generated at step 309, and comprises the plurality of nodes from step 303 and the plurality of weighted edges from steps 305 and 307, wherein the permitted interactions of the model are described by pairs of nodes connected by weighted edges. The associated weights of the edges may be dynamic, in that a measurement of a physical resource associated with an interaction in the model may change over time. Further, a combination of attributes of physical resources may be combined and measured, and the associated weight for the plurality of edges may be determined according to the combined attributes of the physical resources measured.

Figure 4A:
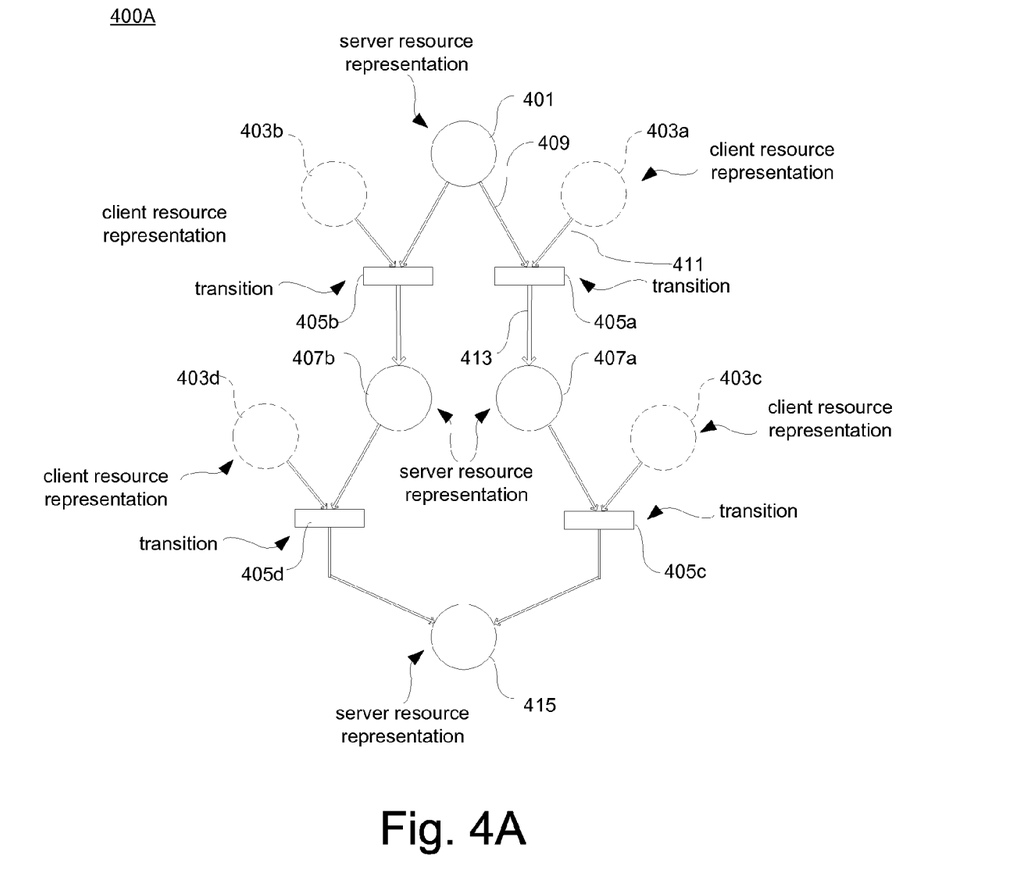
FIG. 4A is a diagram illustrating an exemplary network API model in which network API states and interactions are depicted by a plurality of resource representations and a plurality of transitions in accordance with an embodiment of the present disclosure.
Figure 4B:
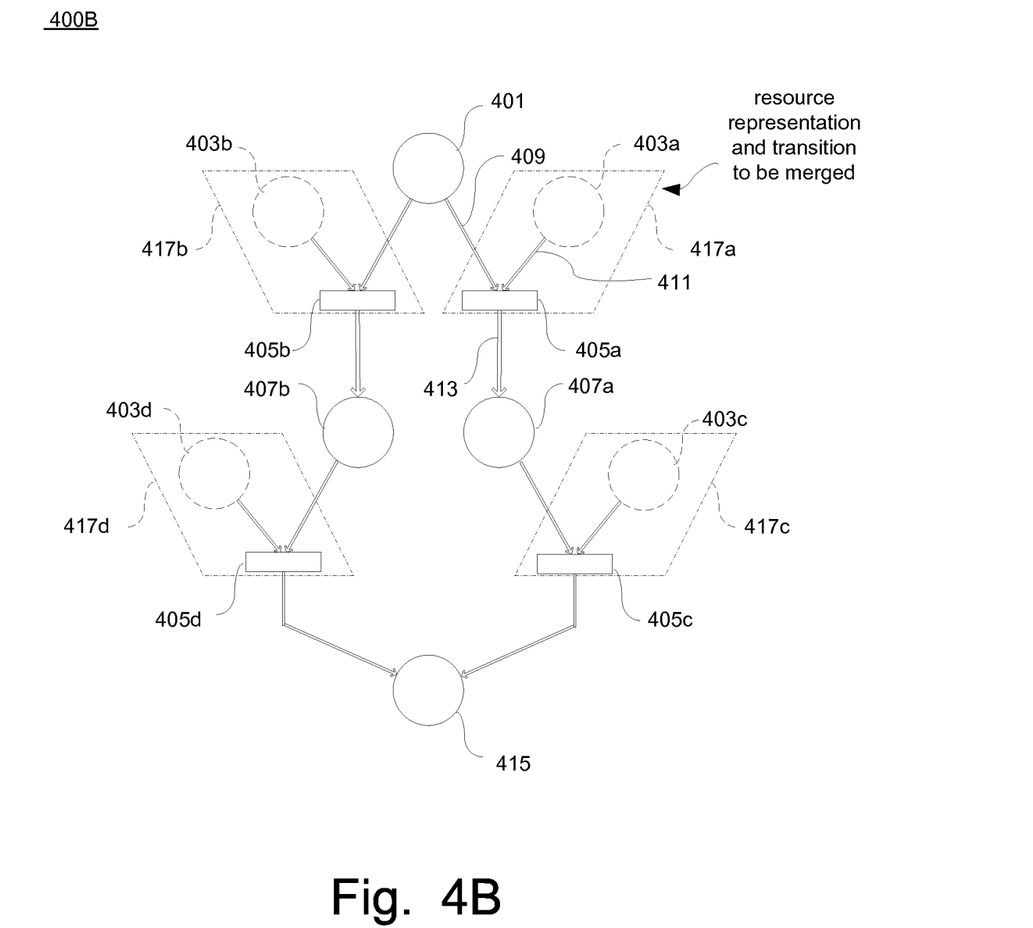
FIG. 4B is a diagram illustrating an exemplary network API model in which network API states and interactions are depicted by a plurality of resource representations and a plurality of transitions, and certain resource representations and transitions are selected for conversion in accordance with an embodiment of the present disclosure.
Figure 4C:
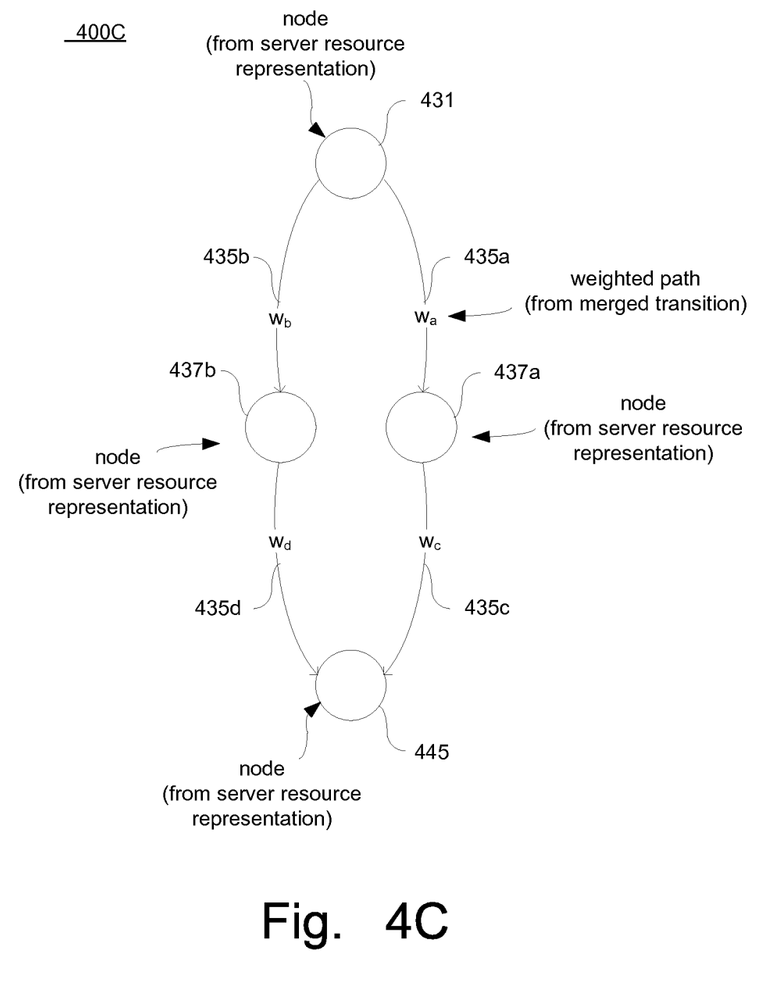
FIG. 4C is a diagram illustrating an exemplary directed, weighted graph in accordance with an embodiment of the present disclosure.

FIGS. 4A, 4B, and 4C provide further detail regarding the API call sequence determination of FIG. 2A and FIG. 2B, according to an embodiment of the present disclosure. FIGS. 4A, 4B depict an exemplary API description (e.g., a Petri Net model), and 4C depicts an exemplary API model (e.g., a directed, weighted graph) resulting from the conversion of the API description to an API model (FIG. 4C). FIG. 4A shows an API Petri Net model 400A modeling available interactions between a client and a server that implements the API. The API Petri Net model 400A has resource representation types 401, 403a-403d, 407a, 407b, and 415; a plurality of transitions 405a-405d; and, arcs 409, 411, and 413 showing the connections of resource representation type 401, resource representation type 403, and resource representation type 407a, respectively, to transition 405a. In an embodiment of the present disclosure, API Petri Net model 400A corresponds to an API implemented on a client-server network, and resource representation types 401, 407a, 407b, and 415 represent server resource representation types (i.e., types of resource representations where the server is responsible for responding to a request for a resource), while 403a-403d represent client resource representation types (i.e., types of resource representations where a client or user agent is responsible for making a request for an application resource). As described above, a "firing" of a transition represents an interaction in the API, such as an interaction between a client and server in the client-server network. For example, an interaction represented on the API Petri Net model 400A is able to include activation of resource representation 401 and resource representation 403a, leading to a firing of transition 405a and subsequent activation of resource representation 407a. In general, a transition will fire when its corresponding incoming resource representations are activated, e.g. 405a fires when resource representation 401 and resource representation 403a are activated.

Given the API Petri Net model 400A and an initial API state of resource representation type 401, two paths leading to resource representation type 415 are available, one path through transition 405a and then transition 405c, the other path through transition 405b and then transition 405d. To determine an optimized path, API Petri Net model 400A is converted into a directed, weighted graph according to an embodiment of the present disclosure.

FIG. 4B shows the exemplary API Petri Net model 400B, indicating portions of the API Petri Net model 400A from FIG. 1 that will be used to generate the directed, weighted graph according to an embodiment of the present disclosure. Parallelograms 417a-417d correspond to resource representation types 403a-403d and transitions 405a-405d, respectively. The parallelograms depict those resource representation types and transitions identified to be merged and to form an edge. Resource representation types which require client input, i.e., client representation types, are identified to be converted to an edge (along with the corresponding transition for which that resource representation type is an input). For example, resource representation type 403a and transition 405a, identified within parallelogram 417a, are converted to an edge between resource representation type 401 and resource representation type 407a in the directed, weighted graph. This edge is weighted in the directed, weighted graph, according to a measure of some physical resource associated with the API. Additionally, arcs 411 and 413 are eliminated. Likewise, the resource representations type and transitions corresponding to 417b-417d are converted to edges connecting the resource representations, and the respective arcs are eliminated. In an embodiment of the present disclosure, the resource representation types 403a-403d are a plurality of client resource representation types, and the resource representation types 401, 407a, 407b, and 415 are server resource representation types. Transitions 405a-405d and the corresponding incoming client resource representations types 403a-403d are converted into weighted edges between server resource representation types 401, 407a, 407b, and 415.

FIG. 4C shows a directed, weighted graph 400C generated from the exemplary API Petri Net model 400A shown in FIG. 4A, according to an embodiment of the present disclosure. The directed, weighed graph 400C has nodes 431, 437a, 437b, and 445, that correspond to resource representation types 401, 407a, 407b, and 415 of FIGS. 4A-4B. The directed, weighted graph has edges 435a-435d that correspond to the resource representation types and transitions identified by labels 417a-417d in FIG. 4B, and which are generated as described above. Edge 435a having weight $w_a$ connects a pair of nodes, node 431 and node 437a. Edge 435b having weight $w_b$ connects a pair of nodes, node 431 and node 437b. Edge 435c having weight $w_c$ connects a pair of nodes, node 437a and node 445. Edge 435d having weight $w_d$ connects a pair of nodes, node 437b and node 445.

The directed, weighted graph 400C enables a determination of the optimal manner to navigate from resource representation type 401 to resource representation type 415 in the API Petri Net model 400A of FIG. 4A. This determination is able to be made by determining a shortest path between node 431 and node 445 in directed, weighted graph 400C, where the length of each path is determined according to the weights associated with the edges along the path. In order to apply weights to the edges, an adjacency matrix is defined, wherein an adjacency value is determined for each pair of connected nodes. The adjacency value represents a measurement of a physical resource attribute associated with the function of the API Petri Net model 400A. The measurement may be a delay between client and server in a client-server network, the size of messages sent and received, computer memory required to perform an interaction, a disk storage used, a network bandwidth, a network latency—measurement of any physical resource associated with the interactions permitted by the API Petri Net model 400A is consistent with the spirit and scope of the present disclosure. Once an adjacency matrix is defined, the weights $w_a$-$w_d$ of the edges are determined by the values corresponding to those node pairs in the adjacency matrix.

The final step in determining the optimal path from resource representation type 431 to target application resource 445 in the directed, weighted graph 400C is to determine a selected path (e.g., a shortest path meeting some specified criteria) from resource representation type 431 to resource representation type 445. For example, a shortest path may be found using one of a number of algorithms well-known to one skilled in the art, including Dijkstra's algorithm, A* search algorithm, Floyd-Warshall algorithm, Johnson's algorithm, and Viterbi algorithm. The selected path found on directed-weighted graph 400C is used to determine an optimal sequence of interactions (represented by transitions) in API Petri Net model 400A As an example, using a modification of Dijkstra's algorithm a shortest path is found between a source node (resource representation type 431) and a sink node (resource representation type 445) on directed, weighted graph 400C; the modification to Dijkstra's algorithm is in saving transitions associated with the edges between nodes along the shortest path, rather than the nodes themselves (as is typical in Dijkstra's algorithm). Saving the transitions associated with the edges of the shortest path enables a sequence of 3-tuples (triples) to be constructed, where the 3-tuple defines a specified transition, and the two specific resource representations that are necessary to be activated in order to fire that transition (i.e., a specified triple may be, for example, resource representation type 401, resource representation type 403a, and transition 405a on API Petri Net model 400A). The transition and resource representation types of each triple in the sequence are found in API Petri Net model 400A. Therefore, a shortest path found between a source resource representation type 431 and sink resource representation type 445 in directed, weighted graph 400C corresponds to an optimal sequence of interactions (transitions) between an initial state (resource representation type) 401 and a target application resource (resource representation type) 415 in API Petri Net model 400A.

Advantageously, this not only ensures a path is found between an initial state and a target application resource in the API, it also ensures it is the shortest path (according to an optimized resource) from the initial state to the target application resource. The resultant client application has a reduced memory footprint for accessing that target application resource, since only those API calls necessary to access the application resources identified by the API call sequence are needed (i.e., the client need not store all of the possible API calls in memory). This results in an increase in the speed of operation for a client to perform interactions with the API. The shortest path determination is efficient with time complexity $O(|P| \log |P|+|T|)$, where P denotes the number of resource representations and T the number of transitions in the API.

In some embodiments the optimal path is determined according to the edge weights associated with a measure of one physical resource. In some embodiments the edge weights are associated with a measure of a combination of physical resources. In some embodiments an optimal path for a first target application resource is determined according to edge weights associated with a measure of a first physical resource, and an optimal path for a second target application resource is determined according to edge weights associated with a measure of a second physical resource. A combination of resources and multiple target application resources are consistent with the spirit and scope of the present disclosure.

An exemplary pseudo-code implementation of generating an API call sequence from a directed, weighted graph is as follows (comment follows '##'):

```
SequenceGenerator(C, A, Pi, Pj)
C: REST Chart, A: adjacency matrix for C, Pi: source
(initial) node, Pj: sink (target) node, d[ ]:
distance to node, s[ ]
IN ={Pi}
For each Pk in P of C do d[Pk] =A[Pi,Pk]
    While Pj not in IN do
        Pk = a resource representation X in
        P-IN with minimum d[X]
        s[Pk] = t(Pi) ##mapping of transition to its server node
        IN += Pk
        For each resource representation X in P-IN do
            dist = d[X]
            d[X] = min(d[X], d[Pk] + [A]Pk, X])
            if (d[X] < dist) then s[X] = t(Pk)
        End
    End
    Y = s[Pj]
    API_call_sequence = (s(Y), Y, c(Y)) ##
    (server node, transition, client node)
    While s(Y) ≠ Pi do
        Y = s[Y]
        API_call_sequence += (s(Y), Y, c(Y))
    End
    Return reverse(API_call)_sequence)
End
```

Figure 5:
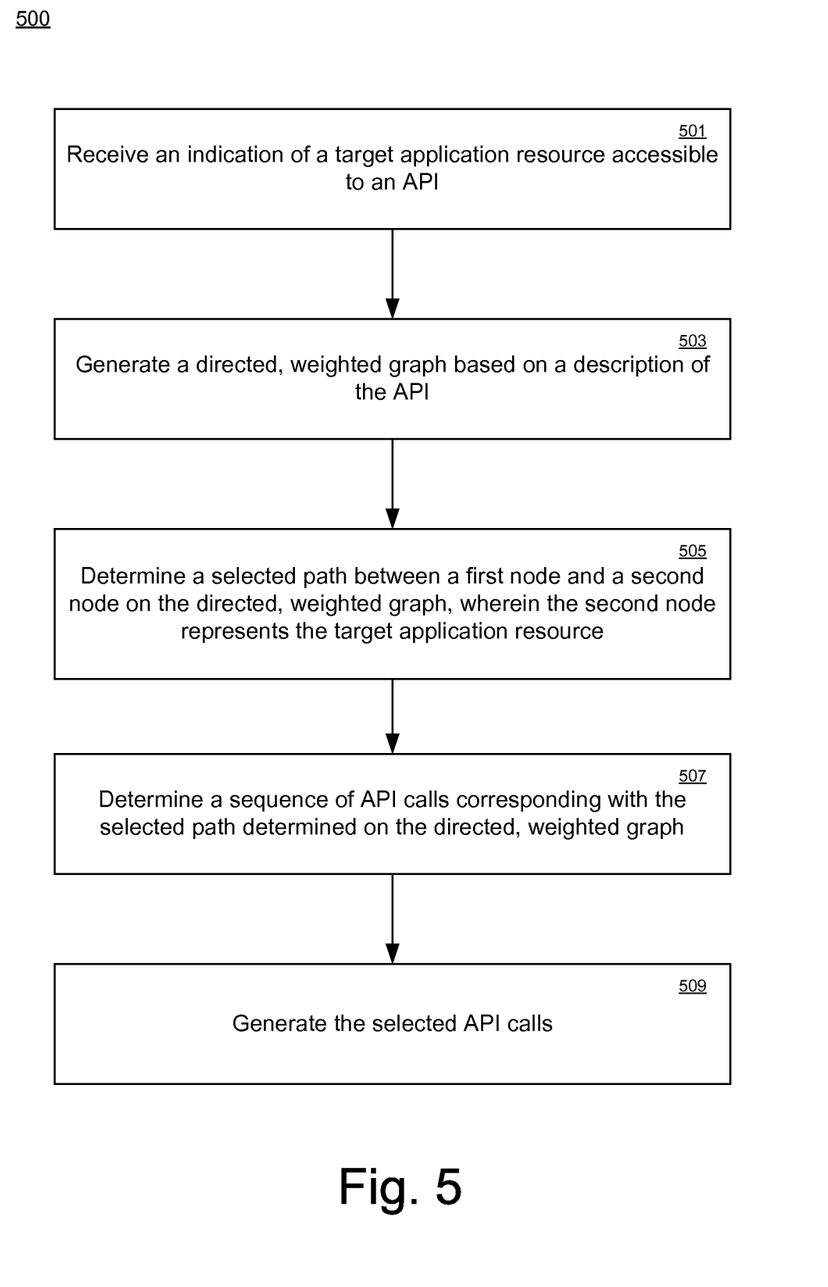
FIG. 5 is a flow chart illustrating an exemplary process for generating a API call sequence to access a target application resource in a network API in accordance with an embodiment of the present disclosure.

FIG. 5 is a flowchart illustrating an exemplary process 500 for generating an API call sequence to access a target application resource in an API, in accordance with an embodiment of the present disclosure. Process step 501 describes receiving an indication of a target application resource accessible to an API. For example, the target application resource may be a representation, including: a document, a file, and a HTTP message entity, instance, or variant. The indication of the target application resource may be made by specifying a resource identifier corresponding to the target application resource. The target application resource is able to be encoded in a machine-readable format, e.g., XML, RDF, and JSON.

Process step 503 describes generating a directed, weighted graph from a description of an API describing the functions and interactions of the API. In an embodiment, the description of the API is a Petri Net model, and the functions and interactions of the API are modeled in the Petri Net by a plurality of resource representations and a plurality of transitions, wherein a plurality of arcs connect certain of the resource representations with certain of the transitions, such that the allowed interactions within the API are described according to the connected resource representations and transitions. For example, the API may be modeled according to the API Petri Net model 400A of FIG. 4A, and the directed, weighted graph may be generated according to exemplary process 300 of FIG. 3.

Process 505 describes determining a selected path between a first node and a second node on the directed, weighted graph. The selected path may be, for instance, a shortest path, which can be found using one of a number of algorithms well-known to one skilled in the art, including Dijkstra's algorithm, A* search algorithm, Floyd-Warshall algorithm, Johnson's algorithm, and Viterbi algorithm.

Process 507 describes determining a sequence of API calls that corresponds with the selected path determined in step 505. The selected path found on the directed-weighted graph in step 505 is used to determine a substantially optimal sequence of interactions (represented by transitions) in the API model. The sequence of API calls is able to be codified according to the unique system elements that are necessary to perform each API call, e.g., for a client-server network by a 3-tuple as described in FIGS. 4A-4C and in FIG. 6. Other elements to codify the sequence are possible, as long as the necessary elements, along with their manner of activation, are specified for performing each given API call in the sequence of API calls.

Process 509 describes generating an API call sequence for the API based on the sequence of API calls determined in step 507. The API call sequence is able to be provided in order to automatically develop a client application, such that the client application may interact with the API in order to access the target application resource. The API call sequence is able to be encoded in a machine-readable format, e.g., XML, RDF, and JSON. Further, the API call sequence is able to be provided to an integrated development environment, in order for a client application to be developed automatically from the specified API call sequence in a variety of programming languages.

FIG. 6 is a diagram of an exemplary API model illustrating several target application resources with corresponding API call sequences in accordance with an embodiment of the present disclosure. The API 600 of FIG. 6 details an API for a coffee ordering webpage, and is represented by a Petri Net model. The resource representation types of the API 600 are labeled according to a message that can be sent from that particular resource representation type. For example, resource representation type 605 is labeled "coffee_order;" the message sent from that resource representation type is a coffee_order message defined by the representation type. An exemplary series of interactions for API 600 is described as follows: the API 600, in an "initial" state 601, receives message "coffee_order" 605. The API 600 sends two messages: one from resource representation type 601 along arc 603 to transition 609 labeled "T0," and one from resource representation type 605 along arc 607 to transition 609. This causes transition 609 to fire, sending a message along arc 611 to resource representation type 613, "order_payment."

Three exemplary target application resources to be accessed by API 600 are illustrated in FIG. 6: target application resource 619, labeled "confirmation;" target application resource 625, labeled "notification;" and target application resource 631, labeled "order deleted." API call sequence 640 corresponds to target application resource 619; API call sequence 650 corresponds to target application resource 625; and API call sequence 660 corresponds to target application resource 631. The API call sequences 640-660 are generated according to embodiments of the present disclosure described above and in FIGS. 2A-2B and 5. In one aspect, an API call sequence specifies a substantially optimized sequence of interactions for an API in order to access the target application resource, represented by resource representations and transitions. An API call sequence is able to have many interactions, where each interaction is defined by a unique 3-tuple representing resource representation types and a transition in an API. The 3-tuple is used to uniquely identify an interaction, since it is possible for there to be many outgoing resource representation types corresponding to one transition. For conciseness a 3-tuple may be represented herein by brackets, for example [resource representation type 1, transition, resource representation type 2], e.g. by [601, 609, 605], or equivalently by the labels provided [initial, T0, coffee_order].

The exemplary API call sequence 640 is detailed as follows. The desired outcome of the exemplary API call sequence is for a client application to interact with the webpage in order to arrive at a confirmation page for an order. The API call sequence 640 specifies the optimal sequence of resource representations and transitions for API 600 to access the target application resource 619. API call sequence 640 has a first interaction defined by 3-tuple [601, 609, 605], or equivalently by the labels provided, [initial, T0, coffee_order]. The next 3-tuple in the API call sequence 640 is [613, 615, 617], corresponding to [order_payment, T1, payment].

Exemplary API call sequence 650 is generated for the desired outcome of a client application making a subscription to receive a notification of an order status. API call sequence 650 has a first interaction defined by 3-tuple [601, 609, 605], or equivalently by the labels provided, [initial, T0, coffee_order]. The next 3-tuple in the API call sequence 650 is [613, 615, 617], corresponding to [order_payment, T1, payment]. This leads the client to resource representation type 619, "confirmation." The next 3-tuple in API call sequence 650 is [619, 623, 621], corresponding to [confirmation, T6, subscription]. This leads the client to resource representation type 625, "notification," satisfying the goal of API call sequence 650.

Exemplary API call sequence 660 is generated for a two-part goal (e.g., two target application resources), the desired outcome of a client first making a confirmation of an order, and subsequently deleting the order. API call sequence 660 has a first interaction defined by 3-tuple [601, 609, 605], or equivalently by the labels provided, [initial, T0, coffee_order]. The next 3-tuple in the API call sequence 660 is [613, 615, 617], corresponding to [order_payment, T1, payment]. This leads the client to resource representation type 619, satisfying the first target application resource, "confirmation." The next 3-tuple in API call sequence 660 is [619, 629, 627], corresponding to [confirmation, T4, delete_2]. This leads the client to resource representation type 631, "order deleted," satisfying the second part of API call sequence 660.

The exemplary API call sequences 640, 650, and 660 illustrated in FIG. 6 are found according to embodiments of the present disclosure described above, for example, according to process 300 of FIG. 3 for converting the Petri Net model to a directed, weighted graph (an example of which is illustrated in FIGS. 4A-4C). In some embodiments, a change in a physical resource selected for weighting the paths of the directed, weighted graph may lead to a different shortest path determined, and thus to a different API call sequence to access the target application resource. Further, different target application resources and combinations of target application resources are consistent with the spirit and scope of the present disclosure.

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention. Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. An apparatus comprising:
   a transceiver configured to receive a request including a target application resource accessible to an application programming interface (API) executable on the apparatus;
   a memory storing a description of the API; and
   a processor communicatively coupled to said transceiver and said memory and configured to:
      access the description of the API;
      generate an API model based on the description, wherein said API model comprises a plurality of elements corresponding to application resource representations and a plurality of weights corresponding to application transitions and associated with a plurality of API calls;
      determine, based on the plurality of weights, a selected sequence of elements between a first and a second element of the plurality of elements, the first element corresponding to an initial application resource accessible to the API and the second element corresponding to the target application resource;
      generate selected API calls based on a selection of the application resource representations and the application transitions corresponding to the selected sequence; and
      send the selected API calls to a client device.

2. The apparatus according to claim 1, wherein the API comprises a Representational State Transfer (REST) API.

3. The apparatus according to claim 2, wherein the REST API is implemented on a software defined network (SDN) as a northbound API.

4. The apparatus according to claim 3, wherein the selected API calls comprise a server resource representation, a transition, and a client resource representation.

5. The apparatus according to claim 1, wherein the apparatus further comprises an Integrated Development Environment tool which is configured to automatically generate API call program code based upon the selected API calls and an API communication protocol.

6. The apparatus according to claim 5, wherein the apparatus is further configured to generate a REST client application, wherein the REST client application is operable to automatically perform the selected API calls.

7. The apparatus according to claim 1, wherein an associated value for each weight of the plurality of weights is determined according to an attribute of a physical resource selected from a plurality of physical resources associated with the plurality of API calls.

8. The apparatus according to claim 7, wherein the plurality of physical resources comprises a computer memory, a disk storage, a number of messages sent, a network bandwidth, and a network latency.

9. The apparatus according to claim 7, wherein a first selection of API calls is generated based on an attribute of a first one of the plurality of physical resources, and a second selection of API calls is generated based on an attribute of a second one of the plurality of physical resources.

10. The apparatus according to claim 1, wherein the API model comprises data for a directed, weighted graph, wherein the plurality of elements comprise graph nodes and the plurality of weights comprise weighted edges arranged as directed connections amongst the graph nodes, and wherein the selected sequence of elements is determined according to a path selected according to the weighted edges.

11. A method of automatically providing a sequence of application programming interface (API) calls to access an application resource, said method executed by a processor, said method comprising:
   receiving information corresponding to a target application resource accessible to an API;
   generating an API model based on a description of the API, wherein said API model comprises a plurality of elements corresponding to application resource representations and a plurality of weights corresponding to application transitions and associated with a plurality of API calls;
   determining, based on the plurality of weights, a selected sequence of elements between a first and a second element of the plurality of elements, the first element corresponding to an initial application resource accessible to the API and the second element corresponding to the target application resource;
   generating selected API calls based on a selection of the application resource representations and the application transitions corresponding to the selected sequence; and
   sending the selected API calls to a client device.

12. The method according to claim 11, wherein the API comprises a Representational State Transfer (REST) API, and further wherein the REST API is implemented on a software defined network (SDN) as a northbound API.

13. The method according to claim 12, wherein the selected API calls comprise a server resource representation, a transition, and a client resource representation.

14. The method according to claim 11, wherein an associated value for each weight of the plurality of weights is determined according to an attribute of a physical resource selected from a plurality of physical resources associated with the plurality of API calls.

15. The method according to claim 14, wherein a first selection of API calls is generated based on an attribute of a first one of the plurality of physical resources, and a second selection of API calls is generated based on an attribute of a second one of the plurality of physical resources.

16. The method according to claim 11, further comprising generating a REST client application, wherein the REST client application is operable to automatically perform the selected API calls.

17. A non-transitory computer-readable medium containing programmed instructions, which, when executed by a processor in an apparatus configured to execute calls to an application programming interface (API), is operable to generate a selection of API calls to access an application resource, the programmed instructions comprising:
  instructions to receive information corresponding to a target application resource accessible to said API;
  instructions to generate an API model based on a description of the API, wherein said API model comprises a plurality of elements corresponding to application resource representations and a plurality of weights corresponding to application transitions and associated with a plurality of API calls;
  instructions to determine, based on the plurality of weights, a selected sequence of elements between a first and a second element of the plurality of elements, the first element corresponding to an initial application resource accessible to the API and the second element corresponding to the target application resource; and
  instructions to generate selected API calls based on a selection of the application resource representations and the application transitions corresponding to the selected sequence.

18. The non-transitory computer-readable medium according to claim 17, wherein the programmed instructions further comprise instructions to determine an associated value for each weight of the plurality of weights, according to an attribute of a physical resource selected from a plurality of physical resources associated with the plurality of API calls.

19. The non-transitory computer-readable medium according to claim 17, wherein the programmed instructions further comprise instructions to generate a REST client application, wherein the REST client application is operable to automatically perform the selected API calls.

20. The non-transitory computer-readable medium according to claim 17, wherein the programmed instructions for generating the API model comprise instructions to generate a directed, weighted graph, wherein the plurality of elements comprise graph nodes and the plurality of weights comprise weighted edges arranged as directed connections amongst the graph nodes, and wherein the selected sequence of elements is determined according to a path selected according to the weighted edges.

* * * * *